United States Patent
Chiang et al.

(10) Patent No.: US 7,178,735 B2
(45) Date of Patent: Feb. 20, 2007

(54) MULTI-FUNCTION PORTABLE COMMUNICATION DEVICE

(76) Inventors: Kuo Ching Chiang, 4F., No. 14 Chungpu 6 street, Taoyuan City, Taoyuan Hsien (TW); Chi Wen Liu, 3F., No. 561 Nan Da Rd., Hsin Chu City (TW); Ching Yu Chang, No. 17, Xin Cheng Rd., Tongle Cun., Yuan Shan Xiang, Yi Lan Xian (TW)

(*) Notice: Subject to any disclaimer, the term of this patent is extended or adjusted under 35 U.S.C. 154(b) by 0 days.

(21) Appl. No.: 10/989,622

(22) Filed: Nov. 15, 2004

(65) Prior Publication Data

US 2006/0102713 A1    May 18, 2006

(51) Int. Cl.
*G06K 7/101* (2006.01)
*H04B 1/40* (2006.01)
*H04M 1/00* (2006.01)

(52) U.S. Cl. .............. 235/472.01; 455/556.1; 455/74

(58) Field of Classification Search ........... 235/380, 235/472.01–472.03; 455/73, 74, 550.1, 556.1, 455/556.2
See application file for complete search history.

(56) References Cited

U.S. PATENT DOCUMENTS

| | | | | |
|---|---|---|---|---|
| 4,665,385 A | * | 5/1987 | Henderson | 340/539.26 |
| 5,517,189 A | * | 5/1996 | Bachhuber et al. | 340/5.64 |
| 6,073,034 A | * | 6/2000 | Jacobsen et al. | 455/566 |
| 6,085,112 A | * | 7/2000 | Kleinschmidt et al. | 455/556.1 |
| 6,292,305 B1 | * | 9/2001 | Sakuma et al. | 359/649 |
| 6,594,616 B2 | * | 7/2003 | Zhang et al. | 702/152 |
| 6,655,597 B1 | * | 12/2003 | Swartz et al. | 235/462.45 |

* cited by examiner

*Primary Examiner*—Michael G. Lee
*Assistant Examiner*—Jamara A. Franklin
(74) *Attorney, Agent, or Firm*—The Maxham Firm

(57) ABSTRACT

The portable device comprises a control IC imbedded in the portable device and a RF module coupled to the control IC for wireless communication. A display and an input unit are coupled to said control IC. Memory is coupled to the control IC to store data and a projection display module is coupled to said control IC for the data projection. The projection display module includes three liquid crystal panels that perform image displays in red, green, and blue, respectively; light emitting sources employed and positioned in correspondence with the liquid crystal panels, respectively. A dichroic prism is used for each display color combination, wherein the liquid crystal panels and the said light emitting sources are positioned on the light-incidence side of the side surfaces of said dichroic prism. A projection lens is provided on the light emission side of the dichroic prism.

11 Claims, 3 Drawing Sheets

MULTI-FUNCTION PORTABLE COMMUNICATION DEVICE

FIELD OF THE INVENTION

The present invention relates generally to a portable terminal and more particularly to a multi-function portable terminal or device.

BACKGROUND OF THE INVENTION

Cellular communications systems typically include multiple base stations for communicating with mobile stations in various geographical transmission areas. Each base station provides an interface between the mobile station and a telecommunications network. Mobile telephone systems are in use or being developed in which the geographic coverage area of the system is divided into smaller separate cells, it communicates with the network via a fixed station located in the cell. Mobile telephones belonging to the system are free to travel from one cell to another. When a subscriber within the same system or within an external system wishes to call a mobile subscriber within this system, the network must have information on the actual location of the mobile telephone.

Recently, the price of cellular telephone has been greatly reduced and become affordable to lots of people. It is common that a person owns more than one cellular phone. Some people even replace their cellular telephones as often as they replace their clothes or hairstyle. The cellular manufactures have to release new models with different appearances, function and styles more frequently so as to attract the attention of the buyer and occupy a favorable marketing share.

SUMMARY OF THE INVENTION

The object of the present invention is to provide a multi-function portable communication device.

The portable device comprises a control IC imbedded in the portable device and a RF module coupled to the control IC for wireless communication. A display and an input unit are coupled to the control IC. Memory is coupled to the control IC to store data and a projection display module is coupled to the control IC for the data projection. The projection display module includes three liquid crystal panels that perform image displays in red, green, and blue, respectively; light emitting sources employed and positioned in correspondence with the liquid crystal panels, respectively. A dichroic prism is used for each display color combination, wherein the liquid crystal panels and the said light emitting sources are positioned on the light-incidence side of the dichroic prism. A projection lens is provided on the light emission side of said dichroic prism to enlarge the projection image. Wherein said light emitting sources are organic EL (electroluminescence) elements that capable of emission of red, green, and blue light.

A portable device comprises a central control IC imbedded in said portable device; a RF module coupled to the control IC for wireless communication and a display, memory and an input unit coupled to the control IC. A pinhole camera detector embedded in said portable device, said pinhole camera detector is sensitive to a transmittance frequency from about 300 MHz to 2.5 GHz.

A further aspect of the present invention is to disclose a portable device comprising a control IC imbedded in the portable device; a RF module coupled to the control IC for wireless communication; a display, memory and an input unit coupled to the control IC; and a remote control module coupled to said central control IC to control lock or a device by the key code coded in the memory.

Anther embodiment of the present invention comprises a control IC imbedded in a portable device; a RF module coupled to the control IC for wireless communication; a display, memory and an input unit coupled to the control IC; and an alcohol ingredients detecting module is provided and coupled to the control IC to detect alcohol containment.

In order to achieve the object of the present invention, a portable device comprises a control IC imbedded in the portable device; a RF module coupled to the control IC for wireless communication; a display, memory and an input unit coupled to the control IC; and an illumination source embedded in the portable device for acting as pointer or flashlight. The illumination source includes a laser component. Wherein the illumination source include a lamp (or LED) and a reflector position in accordance with the lamp to reflect light generated by the lamp.

DETAILED DESCRIPTION

The present invention relates generally to a multi-function portable terminal. The portable terminal includes but not limited to cellular phone, PDA (personal digital assistant), smart phone and the equivalent thereof.

Figure 1:
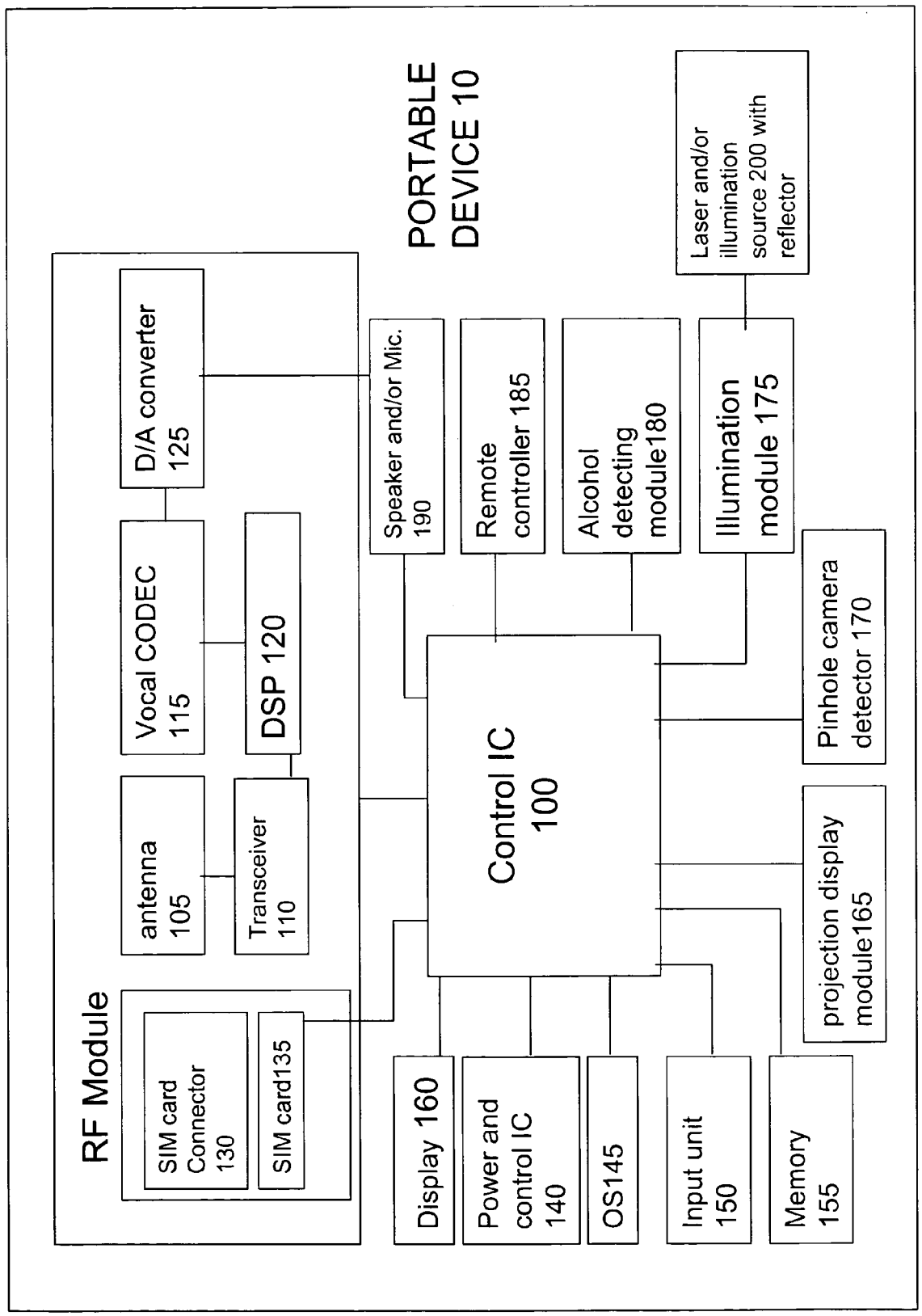
FIG. 1 shows a diagram of a cellular terminal according to the present invention.

FIG. 1 shows a block diagram of a portable terminal with SIM card connector 130 to carry the SIM card 135, it is well know in the art, the SIM card is not necessary for some other type of cellular such as PHS system. The diagram is used for illustrating and not used for limiting the scope of the present invention. The portable terminal or device 10 includes a RF module. As know in the art, the RF module includes antenna 105. This antenna 105 is connected to a transceiver 110, which is used to receive and transmit signal. AS know, the RF module further includes CODEC 115, DSP 120 and A/D converter as well. Due to the RF module is not the feature of the present invention, therefore, the detailed description is omitted. The present invention includes a central control IC 100, an input unit 150, a build-in display 160, OS 145, power and control IC 140 and memory 155 including a ROM program memory, a RAM memory and a nonvolatile FLASH memory. The RF module may perform the function of signal transmitting and receiving, frequency synthesizing, base-band processing and digital signal processing. The SIM card hardware interface is used for receiving a SIM card. Finally, the signal is send to the final actuators, i.e. a loudspeaker and a microphone 190.

The present invention includes one or more following module that is not disclosed by the current cellular terminal. It should be noted that the additional module can be implanted along or combination depending on the necessary.

A pinhole camera detector 170 indicates the addition of a device, which is apt to wireless or wired signal. The pinhole camera detector is sensitive to the transmittance frequency, for example, from the 300 MHz to 2.5 GHz, and is coupled to the control IC 100. The detector also includes a switch coupled to pinhole camera detector to active the detector. As known, the pinhole video camera includes a printed circuit board, a charged coupled device (hereinafter referred to as "CCD"), memory means for storing a single frame image which is generated by image signal from the CCD and a signal converting means, a connector with wires to connect the aforementioned circuits to power source and the displayer. A conical convex lens is accommodated to have an apical angle and the apex is fixed so as to face the pinhole. The pinhole camera detector 120 is available to scan and detect the operation frequency while the pinhole camera is in function. The so-called spy camera could also be detected by the pinhole camera detector 120 as well. The scanned result can be send to the display 160 and/or the loudspeaker and a microphone 190, thereby sending an alarm signal.

Figure 2:
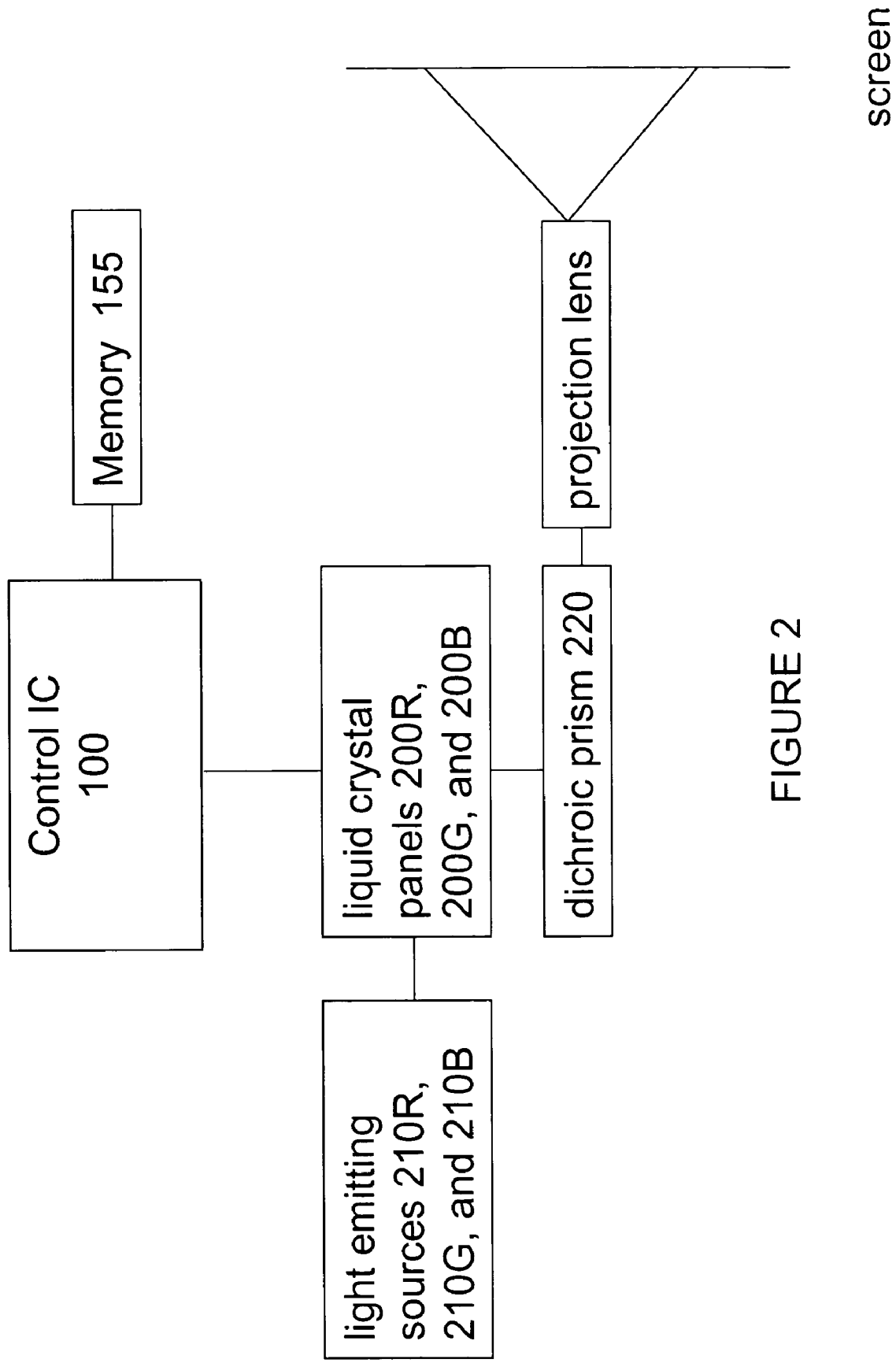
FIG. 2 shows a diagram of a projection display module according to the present invention.
Figure 3:
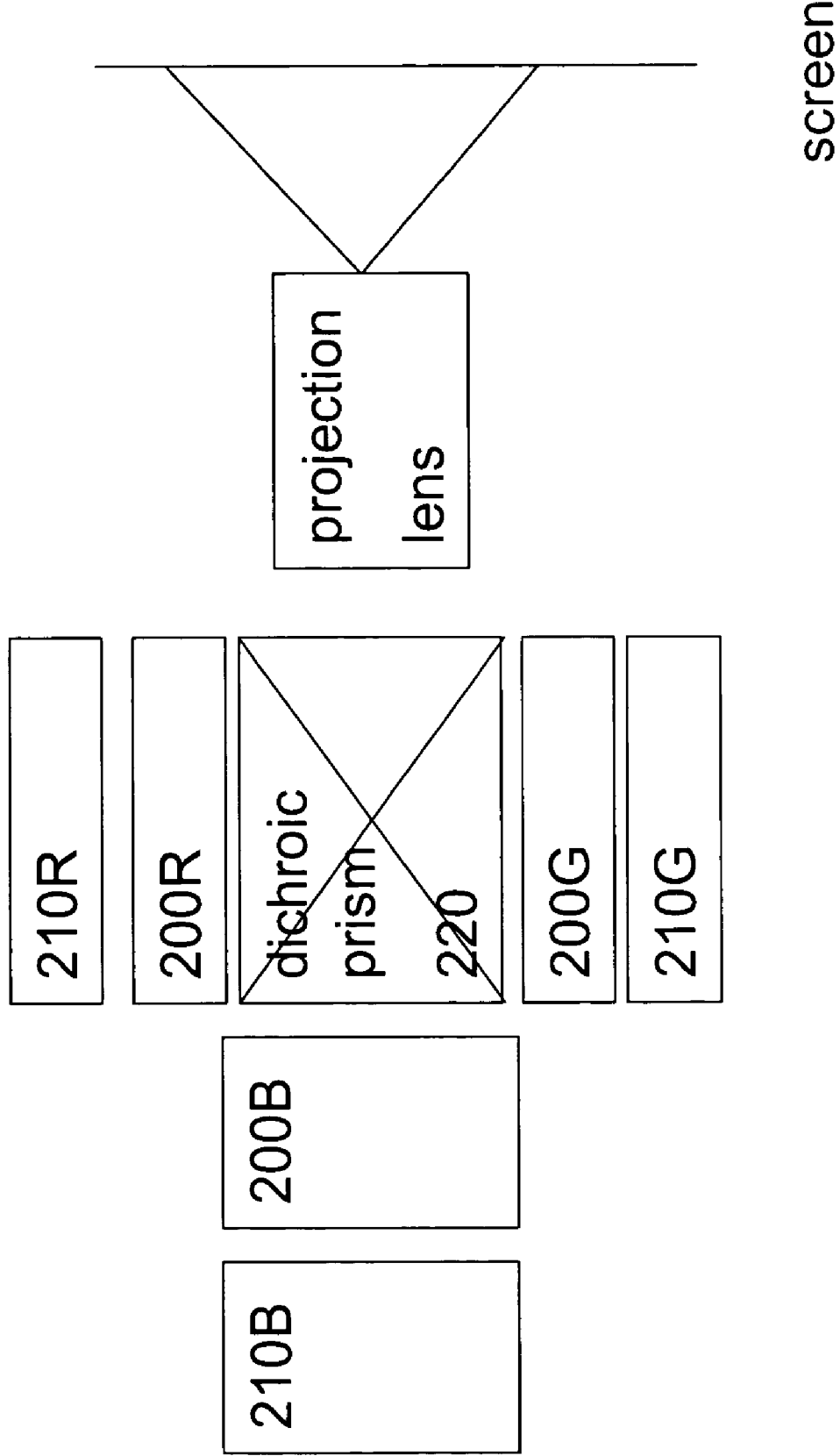
FIG. 3 shows a diagram of a projection display module with EL as the illumination source according to the present invention.

Moreover, the portable terminal according to the present invention shown in FIG. 1 has another function module. An embodiment is now described with reference to FIGS. 2. A projection display module 165 is coupled to the control IC 100. One type of such a projection display module 165 that is known is the liquid crystal projector wherewith images on a liquid crystal panel are enlarged and projected by a projection lens onto a reflective screen and thus displayed. The liquid crystal projection display module comprises a light source lamp unit inside a shell of the device. Electrical discharge lamps such as metal halide lamps, or halogen lamps, could be used in the light source lamp unit. The light emitted from this light source lamp unit is guided via a mirror to dichroic mirrors, whereby it is separated into red light, green light, and blue light. The images displayed on the three liquid crystal panels, respectively, are illuminated by their respective colors, and this light is combined by a dichroic prism. The In preferable embodiment, please refer to FIG. 3, the liquid crystal projector comprises three liquid crystal panels 200R, 200G, and 200B that perform image displays in red, green, and blue, respectively. Preferably, panel-form light emitting sources 210R, 210G, and 210B is employed and positioned in correspondence with the liquid crystal panels, respectively. In one embodiment, the light emitting sources 210R, 210G, and 210B are organic EL (electroluminescence) elements. These organic EL elements are electric-field light emitting thin films that capable of emission of red, green, and blue light. The EL elements are formed behind and adjacent to the liquid crystal panels 200R, 200G, and 200B, respectively. The liquid crystal panels 200R, 200G, and 200B and the light sources 210R, 210G, and 210B are positioned on the light-incidence side of the side surfaces of the dichroic prism 220 for each display color combination. The projection lens 230 could be made up of a plurality of lenses. Thus, the data or file stored in the memory of the device can be projected on a screen or wall. It allows the user to project the image, game or file on an external screen. The EL element is small, flat form, light weight, therefore, it allows the small projection to be integrated in the portable device.

Another aspect of the present invention is that the device 10 also includes remote control module 185. The remote control module 185 maybe used to control lock or device by the key code coded in the remote control module 185. The remote controller is also a mature technology. Remote controllers for electrical and electronic appliances are well known, and are widely used. In one example, the remote control module 185 applies infrared rays for transmission, and each company provides its appliances and remote controllers with its specific protocol of communication. An example of the remote control module 185 is provided with an interface for downloading the relevant information into the remote control module 185 from an external source. In one embodiment of remote controller is provided with an infrared transmitter for sending remote controlling signals to the appliance. The remote controller is provided with a RAM or ROM, or EPROM, or EEPROM internal database (memory 155) to which set-up information regarding the key-map and signal format of at least one apparatus to be controlled is entered. Such information can be commonly provided to the internal database from various sources, such as from a smart card, from an Internet database, from a plugged-in card, etc. The database in the appliance contains set-up data that can be transmitted by transmitter to the remote control module 185 providing it all the information it needs in order to control the appliance. The present invention uses the RF module to download the key code from database through network.

Another aspect of the present invention is that the portable device 10 also includes an alcohol detecting module 180. The alcohol ingredients detecting module 180 is provided and coupled to the control IC 100 to detect the alcohol ingredients from one's breath, for example, the module is capable of detecting alcohol content. The alcohol detecting module 180 is sensitive to the aforementioned alcohol content. If the bonding is detected, the signal will be send from the alcohol detecting module 180 to the control IC 100 for determine the level of the alcohol ingredients. Then, the result will be send to the display 160. U.S. Pat. No. 5,907,407 had disclosed various methods to detecting the alcohol. U.S. Pat. No. 4,809,810 disclosed a system both apparatus and method, for analyzing a breath sample.

Further, an illumination module 175 is also employed by the present invention. The portable device could be used as a laser pointer if the illumination module 175 includes a laser component 200. A switch can be provided to active the laser. In another embodiment, the illumination module 175 includes a light source to allow the portable device to be used as the flashlight. Especially, one may turn on the illumination module 175 in dark environment such as in a theater. The illumination module 175 could be coupled to the control IC 100 or implanted with an independent control IC. The illumination source includes a laser component. Wherein the illumination source include a lamp (or LED) and a reflector position in accordance with the lamp to reflect light generated by the lamp.

As will be understood by persons skilled in the art, the foregoing preferred embodiment of the present invention is illustrative of the present invention rather than limiting the present invention. Having described the invention in connection with a preferred embodiment, modification will now suggest itself to those skilled in the art. Thus, the invention is not to be limited to this embodiment, but rather the invention is intended to cover various modifications and similar arrangements included within the spirit and scope of the appended claims, the scope of which should be accorded the broadest interpretation so as to encompass all such modifications and similar structures. While the preferred embodiment of the invention has been illustrated and described, it will be appreciated that various changes can be made therein without departing from the spirit and scope of the invention.

What is claimed is:

1. A portable communication device comprising:

a control IC embedded in said portable communication device;

an RF module coupled to said control IC for wireless communication;

a built-in display and an input unit coupled to said control IC; memory coupled to said control IC to store data; and a liquid crystal projection display module inside a shell of said portable communication device and coupled to said control IC for data projection, wherein said liquid crystal projection display module comprises:

a dichroic prism used for each display color combination, three color image display liquid crystal panels that perform image displays in red, green, and blue, respectively are positioned on the light-incidence side of said dichroic prism for each display color combination:

organic EL (electroluminescence) elements that are capable of emission of red, green, and blue light are located adjacent to said three liquid crystal panels;

said electroluminescence elements being inside said shell of said portable communication device and positioned in correspondence with said three color image display liquid crystal panels; wherein said three color image display liquid crystal panels and said organic electroluminescence elements are positioned on a light-incidence side of said dichroic prism; and a projection lens provided on a light emission side of said dichroic prism to enlarge the projection image.

2. The portable communication device of claim 1, and further comprising:

a pinhole camera detector embedded in said portable device, said pinhole camera detector being sensitive to a transmittance frequency.

3. The portable communication device of claim 2, wherein said transmittance frequency is about from 300 MHz to 2.5 GHz.

4. The portable communication device of claim 1, and further comprising:

a remote control module coupled to said central control IC to control a lock or a device by a key code coded in said memory.

5. The portable communication device of claim 1, and further comprising:

an alcohol ingredients detecting module coupled to said central control IC to detect alcohol ingredients.

6. The portable communication device of claim 1, and further comprising:

a pointer or flashlight illumination source embedded in said portable device for acting as a pointer or a flashlight.

7. The portable communication device of claim 6, wherein said pointer illumination source includes a laser component.

8. The portable communication device of claim 6, wherein said flashlight illumination source includes: a lamp; and a reflector positioned in accordance with said lamp to reflect light generated by said lamp.

9. The portable communication device of claim 6, wherein said illumination source includes: an LED and a reflector positioned in accordance with said LED to reflect light generated by said LED.

10. The portable communication device of claim 1, and further comprising:

a remote control module coupled to said central control IC to control a lock or a device by a key code coded in said memory; and an interface provided to said remote control module for downloading information into said remote control module from an external source.

11. The portable communication device of claim 10, wherein said external source includes a smart card, an Internet database or a plugged-in card.

* * * * *